United States Patent [19]

Favstritsky

[11] 4,337,191
[45] Jun. 29, 1982

[54] POLYESTER OF PARA-HYDROXY BENZOIC ACID, 2,6-NAPHTHALENE DICARBOXYLIC ACID, TEREPHTHALIC ACID AND METHYLHYDROQUINONE EXHIBITING IMPROVED HYDROLYTIC STABILITY AND WHICH IS CAPABLE OF FORMING AN ANISOTROPIC MELT

[75] Inventor: Nicolai A. Favstritsky, Broomall, Pa.

[73] Assignee: Fiber Industries, Inc., New York, N.Y.

[21] Appl. No.: 91,003

[22] Filed: Nov. 5, 1979

[51] Int. Cl.$^3$ ............................................. C08G 63/06
[52] U.S. Cl. ................................. 524/599; 528/176; 528/190; 528/193
[58] Field of Search ............. 528/190; 260/40 R, 40 P

[56] References Cited

U.S. PATENT DOCUMENTS

| | | | |
|---|---|---|---|
| 3,991,013 | 11/1976 | Pletcher | 528/190 |
| 3,991,014 | 11/1976 | Kleinschuster | 528/190 |
| 4,067,852 | 1/1978 | Calundann | 528/190 |
| 4,083,829 | 4/1978 | Calundann et al. | 528/190 |
| 4,118,372 | 10/1978 | Schaefgen | 528/190 |
| 4,130,545 | 12/1978 | Calundann | 528/190 |
| 4,146,702 | 3/1979 | Morris et al. | 528/190 |
| 4,153,779 | 5/1979 | Jackson, Jr. et al. | 528/190 |
| 4,169,933 | 10/1979 | Jackson, Jr. et al. | 528/190 |
| 4,184,996 | 1/1980 | Calundann | 528/190 |
| 4,188,476 | 2/1980 | Irwin | 528/190 |

*Primary Examiner*—Harold D. Anderson
*Attorney, Agent, or Firm*—Charles B. Barris

[57] ABSTRACT

A novel polyester is provided which has been found to exhibit an anisotropic melt phase at a temperature which enables it readily to undergo melt processing to form quality fibers, molded articles, etc. The polyester of the present invention includes as essential ingredients moieties derived from para-hydroxy benzoic acid, 2,6-naphthalene dicarboxylic acid, terephthalic acid, and methylhydroquinone in the proportions indicated. In a preferred embodiment the polyester is capable of undergoing melt processing at a temperature below approximately 320° C., and in a particularly preferred embodiment at a temperature below approximately 300° C. (e.g., with standard equipment commonly used to melt process polyethylene terephthalate). Fibers conveniently can be melt spun from the polyester of the present invention which exhibit tenacity values which are enchanced upon thermal treatment. It surprisingly has been found that the polyester of the present invention exhibits a hydrolytic stability which is substantially greater than that of the polyester of U.S. Pat. No. 4,083,829.

16 Claims, No Drawings

POLYESTER OF PARA-HYDROXY BENZOIC ACID, 2,6-NAPHTHALENE DICARBOXYLIC ACID, TEREPHTHALIC ACID AND METHYLHYDROQUINONE EXHIBITING IMPROVED HYDROLYTIC STABILITY AND WHICH IS CAPABLE OF FORMING AN ANISOTROPIC MELT

BACKGROUND OF THE INVENTION

Aromatic polyester resins have long been known. For instance, p-hydroxy benzoic acid homopolymer and copolymers have been provided in the past and are commercially available. Those aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty. Such polymers commonly cannot be melt extruded to form nondegraded fibers. Even those aromatic polymers which exhibit a melting point below their decomposition temperature commonly melt at such high temperatures that quality fibers may not be melt spun. For instance, fibers melt extruded at extremely high temperatures commonly possess a voidy internal structure and diminished tensile properties.

Representative publications which discuss aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters from Aromatic Dicarboxylic Acids and Bisphenols)*, by G. Bier, Polymer, Vol. 15, Pages 527 to 535 (August 1974), (c) *Aromatic Polyester Plastics*, by S. G. Cottis, Modern Plastics, Pages 62 to 63 (July 1975), and (d) *Poly (p-Oxybenzoyl Systems): Homopolymer for Coatings: Copolymers for Compression and Injection Molding*, by Roger S. Storm and Steve G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,778,410; 3,787,370; 3,790,528; 3,829,406; 3,890,256; and 3,975,487.

Also, it more recently has been disclosed that certain polyesters may be formed which exhibit melt anisotrophy. See for instance, (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch No. 7505551, (d) West German Nos. 2520819, 2520820, 2834535, 2834536, and 2834537, (e) Japanese Nos. 43-233, 2132-116, 3017-692, and 3021-293, (f) U.K. Patent Application No. 2,002,404, and (g) U.S. Pat. Nos, 3,991,013; 3,991,014; 4,066,620; 4,067,852; 4,075,262; 4,083,829; 4,118,372; 4,130,545; 4,153,779; 4,156,070; 4,159,365; 4,161,470; and 4,169,933. See also commonly assigned U.S. Ser. No. 877,917 filed Feb. 15, 1978 (now U.S. Pat. No. 4,184,996); Ser. No., 010,392, filed Feb. 8, 1979 (now U.S. Pat. No. 4,238,599); Ser. No. 10,393, filed Feb. 8, 1979 (now U.S. Pat. No. 4,238,598); Ser. No. 17,007, filed Mar. 2, 1979 (now U.S. Pat. No. 4,230,817); Ser. No. 021,050, filed Mar. 16, 1979 (now U.S. Pat. No. 4,224,433); Ser. No. 032,086, filed Apr. 23, 1979 (now U.S. Pat. No. 4,219,461); and Ser. No. 054,049, filed July 2, 1979 (now U.S. Pat. No. 4,256,624).

Commonly assigned U.S. Pat. No. 4,083,829 discloses inter alia a melt processable polyester of parahydroxy benzoic acid, 2,6-naphthalene dicarboxylic acid, isophthalic acid, and unsubstituted hydroquinone. It has been found during subsequent testing that such polyester when subjected to certain extreme environments is susceptible to hydrolytic degradation to a significant degree as discussed hereafter. For instance, if the polyester is in the form of a fiber and is subjected to such environments, the fiber strength is significantly reduced upon the passage of time. U.S. Pat. No. 4,169,933 discloses a polyester of parahydroxy benzoic acid, 2,6-naphthalene dicarboxylic acid, terephthalic acid, and hydroquinone.

It is an object of the present invention to provide an improved melt processable polyester which exhibits an anisotropic melt phase.

It is an object of the present invention to provide a novel melt processable polyester which exhibits a substantially greater hydrolytic stability than the polyester of U.S. Pat. No. 4,083,829.

It is an object of the present invention to provide an improved polyester which is suited for the formation with ease of quality melt extruded fibers, molded articles, and melt extruded films.

It is an object of the present invention to provide an improved melt processable polyester capable of forming an anisotropic melt phase at a temperature below approximately 320° C., preferably below approximately 300° C., and most preferably below approximately 290° C.

It is an object of the present invention to provide a novel polyester which is capable of melt processing in standard equipment commonly utilized with polyethylene terephthalate.

It is an object of the present invention to provide an improved polyester which forms an anisotropic melt phase at a temperature well below its decomposition temperature and which may form quality high performance fibers.

It is an object of the present invention to provide improved polyester fibers which particularly are suited for use as fibrous reinforcement in a rubber matrix, or in other matrices (e.g., polyester, polyepoxide, etc.) which are subjected to extreme conditions of heat and moisture during their operating lives.

These and other objects, as well as the scope, nature and utilization of the invention will be apparent to those skilled in the art from the following detailed description.

SUMMARY OF THE INVENTION

It has been found that a melt processable polyester capable of forming an anisotropic melt phase at a temperature below approximately 320° C. consists essentially of the recurring moieties I, II, III,, and IV wherein:

I is 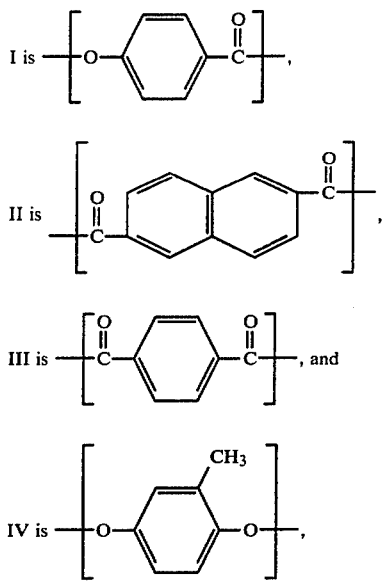

II is

III is , and

IV is , and wherein the polyester comprises approximately 20 to 70 mole percent of moiety I, approximately 10 to 30 mole percent of moiety II, approximately 4 to 30 mole percent of moiety III, and approximately 20 to 40 mole percent of moiety IV.

DESCRIPTION OF PREFERRED EMBODIMENTS

The polyester of the present invention consists essentially of at least four recurring moieties which when combined in the polyester have been found to form an atypical anisotropic melt phase at a temperature below approximately 320° C., preferably below approximately 300° C., and most preferably below approximately 290° C. (e.g., at approximately 260° to 300° C.). The polymer melting temperatures may be confirmed by the use of a differential scanning calorimeter (i.e., DSC) employing repeat scans at a 20° C. per minute heat-up rate and observing the peak of the DSC melt transition. The polyester commonly exhibits a melting point of at least 260° C. as determined by differential scanning calorimetry. Because of its ability to exhibit anisotropic properties (i.e., liquid crystals) in the melt, the polyester readily can form a product having a highly oriented molecular structure upon melt processing. Preferred polyesters are capable of undergoing melt processing at a temperature in the range of approximately 280° to 300° C. employing equipment commonly utilized with polyethylene terephthalate. The usual difficulties incurred when one attempts to melt process aromatic polyesters by conventional melt processing techniques effectively are eliminated.

Moiety I can be termed a para-oxybenzoyl moiety and possesses the structural formula:

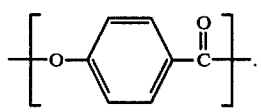

This moiety is relatively inexpensive and is derived from para-hydroxy benzoic acid or its derivatives. Moiety I is present in a substantial concentration which comprises approximately 20 to 70 mole percent of the polyester. In a preferred embodiment moiety I is present in a concentration of 45 to 55 mole percent of the polyester (e.g., approximately 50 mole percent of the polyester).

The second essential moiety (i.e., moiety II) of the wholly aromatic polyester is a 2,6-dicarboxynaphthalene moiety of the structural formula:

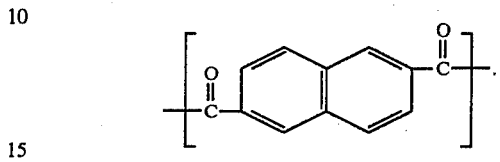

This moiety can be derived from 2,6-naphthalene dicarboxylic acid. Moiety II is present in a concentration of approximately 10 to 30 mole percent of the polyester, and preferably in a concentration of approximately 15 to 25 mole percent of the polyester (e.g., approximately 20 mole percent of the polyester).

The third essential moiety (i.e., moiety III) can be termed a terephthaloyl moiety and possesses the structural formula:

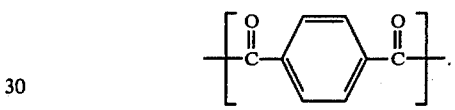

This moiety is relatively inexpensive and is derived from terephthalic acid. Moiety III is present in a concentration of approximately 4 to 30 mole percent of the polyester, and preferably in a concentration of approximately 4 to 10 mole percent of the polyester (e.g., approximately 5 mole percent of the polyester). It has been found that the terephthaloyl moiety in combination with the other moieties yields a polyester possessing highly desirable hydrolytic stability and melt processability characteristics.

The fourth essential moiety (i.e., moiety IV) is a 2-methyl-1,4-dioxyphenylene moiety of the structural formula:

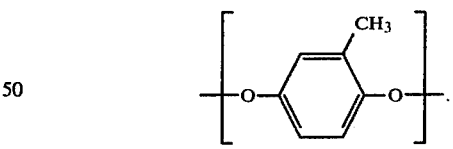

Moiety IV can be provided by methyl hydroquinone. Moiety IV is present in a concentration of approximately 20 to 40 mole percent of the polyester, and preferably in a concentration of about 20 to 30 mole percent of the polyester (e.g., approximately 25 mole percent of the polyester). The total molar concentration of moieties II and III in the resulting polyester is substantially identical to that of moiety IV in preferred embodiments. A slight excess of the methylhydroquinone may be added to the reaction vessel in order to compensate for a small proportion of this reactant which may be inadvertently volatilized as the polymerization reaction progresses. Halogen substituted 1,4-dioxyphenylene moieties have been found to yield polyesters of substantially reduced hydrolytic stability.

Other aryl ester-forming moieties (e.g., dicarboxy units, dioxy units and/or other combined oxy and carboxy units) other than moieties I, II, III and IV additionally may be included in the wholly aromatic polyester of the present invention in a minor concentration (e.g., up to about 10 mole percent) so long as such moieties do not adversely influence the desired anisotropic melt phase exhibited by the polyester heretofore defined, do not raise the melting point of the resulting polymer above that specified or otherwise change the basic character of the polymer. As will be apparent to those skilled in the art, the total molar quantities of all dicarboxy units and dioxy units present within the polyester will be substantially equal. Additionally, a minor quantity of another moiety derived from an aromatic hydroxy acid, such as meta-oxybenzoyl moiety which is derived from m-hydroxy benzoic acid, optionally may be included in the polyester together with moieties I, II, III and IV. This component has the propensity to disrupt the linearity of the polymer thus increasing the amorphous content. Also a 6-oxy-2-naphthoyl moiety optionally may be provided in a minor concentration as can a 2,7-dicarboxynaphthalene moiety. In a preferred embodiment the polyester consists solely of the four essential moieties previously identified.

The polyester of the present invention commonly exhibits

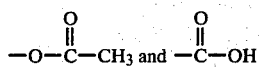

end groups. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

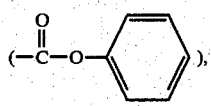

and methylester

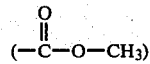

optionally may be included at the end of the polymer chains. The polymer also may be oxidatively crosslinked to at least some degree, if desired, by heating in an oxygen-containing atmosphere (e.g., in air) while in bulk form or as a previously shaped article at a temperature below its melting point for a limited period of time (e.g., for a few minutes).

The polyesters of the present invention tend to be substantially insoluble in common polyester solvents and acccordingly are not susceptible to solution processing. They can surprisingly be readily processed by common melt processing techniques as discussed hereafter. Most compositions are soluble to a small degree in pentafluorophenol, hexafluoroisopropanol, and 50/50 mixtures of hexafluoroisopropanol and orthochlorophenol.

The polyester prior to heat treatment commonly exhibits an inherent viscosity (i.e., I.V.) of at least approximately 2.5 dl./g., and preferably at least approximately 3.0 dl./g., (e.g., approximately 3.0 to 7.5 dl./g.) when dissolved at a concentration of 0.3 weight-/volume percent in pentafluorophenol at 60° C. using standard solution viscometry techniques. The inherent viscosity is obtained by dividing the natural logarithm of the relative viscosity by the concentration of the solution. The relative viscosity is the ratio of the flow times for a dilute polymer solution and the pure solvent in a capillary viscometer.

Unlike the aromatic polyesters commonly encountered in the prior art, the polyester of the present invention is not intractable and forms a relatively low viscosity anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which readily is amenable for melt processing to form shaped articles, and may be confirmed by conventional polarized light techniques whereby crossed-polarizers are utilized. More specifically, the anisotropic melt phase may conveniently be confirmed by the use of a Leitz polarizing microscope at a magnification of 40× with the sample on a Kofler hot stage and under a nitrogen atmosphere. The polymer melt is optically anisotropic, i.e., it transmits light when examined between crossed polarizers. By contrast the melt of a conventional polymer (e.g., polyethylene terephthalate) will not transmit appreciable light when placed between crossed polarizers.

The polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as solid polymer particles are suspended therein. A vacuum may be applied to facilitate removal of volatiles formed during the final stage of the condensation (e.g., acetic acid or water).

In commonly assigned U.S. Pat. No. 4,083,829 entitled "Melt Processable Thermotropic Wholly Aromatic Polyester" is described a slurry polymerization process which may be employed to form the polyester of the present invention wherein the solid product is suspended in a heat exchange medium. The disclosure of this patent is herein incorporated by reference.

When employing either the melt acidolysis procedure or the slurry procedure of U.S. Pat. No. 4,083,829 the organic monomer reactants from which the para-oxybenzoyl moiety (i.e., moiety I) and 2-methyl-1,4-dioxyphenylene moiety (i.e., moiety IV) are derived may be initially provided in a modified form whereby the usual hydroxyl groups of these monomers are esterified (i.e., they are provided as acyl esters). For instance, lower acyl esters of parahydroxy benzoic acid and methylhydroquinone wherein the hydroxy groups are esterified may be provided as reactants. The lower acyl groups preferably have from about 2 to about 4 carbon atoms. Preferably the acetate esters of the organic compounds which form moieties I and IV are provided. Accordingly, particularly preferred reactants for the condensation reaction are 4-acetoxybenzoic acid, and methylhydroquinone diacetate. If minor quantities of other aryl reactants (as previously discussed) optionally provide oxy-units within the resulting polymer, these too preferably are provided as the corresponding lower acyl esters. In a preferred embodiment a slight excess of the source for moiety IV is provided at the time of the polyester-forming reaction.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The inherent viscosity of a previously formed polyester may be further increased via a solid state polymerization procedure wherein the particulate polymer is heated in an inert atmosphere (e.g., in a nitrogen atmosphere at a temperature of about 260° C. for 1 to 12 hours).

The aromatic polyester of the present invention readily can be melt processed to form a variety of shaped articles, e.g., fibers, films, tapes, molded three-dimensional articles, etc. Fibers or films may be melt extruded with ease. The polyester of the present invention also is suited for molding applications and may be molded via standard injection molding techniques commonly utilized when forming molded articles. Unlike the aromatic polyesters commonly encountered in the prior art, it is not essential that more severe injection molding conditions (e.g., higher temperatures), compression molding, impact molding, or plasma spraying techniques be utilized.

A molding compound may be formed from the polyester of the present invention which incorporates approximately 1 to 60 percent by weight of a solid filler (e.g., talc) and/or reinforcing agent (e.g., glass fibers).

The aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable polyester is supplied to the extrusion orifice at a temperature above its melting point, e.g., a temperature of about 285° to 305° C. in a preferred embodiment.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film following extrusion optionally may be subjected to a thermal treatment whereby its physical properties are further enhanced. The tenacity of the fiber of film generally is increased by such thermal treatment. More specifically, the fibers or films may be thermally treated in an inert atmosphere (e.g., nitrogen, argon, helium) with or without stress at a temperature below the polymer melting point until the desired property enhancement is achieved. When stress is applied the tensile modulus may be enhanced. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber gradually may be heated in flowing nitrogen to 250° C. or 270° C. and maintained at such temperature for approximately 18 hours. Optimum heat treatment conditions will vary with the specific composition of the aromatic polyester and with the fiber's process history. In order to minimize any tendency or coalescence between adjoining filaments during the heat treatment, a finely divided particulate solid (e.g., talc, silica, or mixtures of talc and silica) can be applied to a fiber bundle prior to such treatment.

The as-spun fibers formed from the polyester of the present invention are highly oriented and exhibit physical properties which render them suitable for use in high performance applications. The as-spun fibers commonly exhibit an average single filament tenacity of at least 4 grams per denier (e.g., about 5 to 10 grams per denier), and an average single filament tensile modulus of at least about 200 grams per denier (e.g., about 200 to 500 grams per denier), and exhibit an extraordinary dimensional stability at elevated temperature (e.g., at temperatures of about 150° to 200° C.). Following thermal treatment (previously described) the fibers often exhibit a substantially enhanced average single filament tenacity of at least 10 grams per denier (e.g. 10 to 30 grams per denier), and an average single filament tensile modulus well above 250 grams per denier measured at ambient conditions (e.g., 72° F. and 65 percent relative humidity). Such properties in combination with improved hydrolytic stability properties enable the fibers to be used with particular advantage as tire cords and in other demanding industrial applications, such as conveyor belts, hose, cabling, resin reinforcement, etc. Films formed of the polyester of the present invention may be used as strapping tape, cable wrap, magnetic tape, electric motor dielectric films, etc. The fibers and films exhibit an inherent resistance to burning.

The following example is presented as a specific illustration of the claimed invention. It should be understood, however, that the invention is not limited to the specific details set forth in the example.

EXAMPLE

To a three-necked, 300 ml. flask equipped with a mechanical stirrer, argon inlet tube, and distillation head connected to a condenser were added the following:

(a) 47.37 grams para-acetoxybenzoic acid (0.2632 mole), (b) 22.74 grams 2,6-naphthalene dicarboxylic acid (0.1053 mole),
(c) 4.37 grams terephthalic acid (0.0263 mole), and
(d) 25.53 grams methylhydroquinone diacetate (0.1227 mole).

The charged flask was vacuum purged with argon and brought to a temperature of 260° C. while placed in a silicone oil bath. The bath temperature next was raised to 270° C. and maintained at that temperature for 2 hours during which time approximately 56 percent of the acetic acid was distilled. The bath temperature then was raised to 280° C. and maintained at that temperature for approximately 1 hour. The bath temperature next was raised to 320° C. and maintained at that temperature for approximately 2 hours while a vacuum of 0.05 mm. mercury was applied.

This polyester product had an inherent viscosity (I.V.) of 3.16 dl./g. when dissolved at a concentration of 0.3 weight/volume percent in pentafluorophenol at 60° C. The inherent viscosity was determined in accordance with the formula:

$$I.V. = \frac{\ln(\eta\ rel)}{c}$$

where c=concentration of solution (0.3 weight/volume percent) and $\eta$ rel=relative viscosity. The relative viscosity was measured by dividing the flow time in a capillary viscometer of the polymer solution by the flow time for the pure solvent.

When the product was subjected to differential scanning calorimetry analysis (DSC), it exhibited a melting point of 272° C. The polymer melt was anisotropic.

The polymer was melt extruded into a continuous filament of about 18 denier per filament. More specifically, the polymer melt while at a temperature of about 285° C. was extruded through a spinneret provided with a single hole jet having a diameter of 9 mils and a length of 27 mils. The extruded filament was quenched in ambient air. The as-spun filament was taken up at a rate of about 1130 feet per minute.

The resulting as-spun aromatic polyester fiber exhibited the following average single filament properties:

| | |
|---|---|
| Tenacity (grams per denier) | 5.24 |
| Tensile modulus (grams per denier) | 393 |
| Elongation (percent) | 1.57 |

Following thermal treatment in a flowing nitrogen wherein the filament was gradually heated to 280° C. over a period of approximately 9 hours and maintained at that temperature for approximately 17 hours while present on a frame at substantially constant length the fiber exhibited the following average single filament properties:

| | |
|---|---|
| Tenacity (grams per denier) | 13.3 |
| Tensile modulus (grams per denier) | 450 |
| Elongation (percent) | 3.1 |

The fiber also exhibited a low degree of shrinkage at elevated temperatures and a good retention of tenacity and tensile modulus values at temperatures up to about 150° to 200° C.

The hydrolytic stability of the resulting thermally treated fiber was tested and found to be substantially greater than that of a thermally treated polyester of U.S. Pat. No. 4,083,829 which consisted of approximately 60 mole percent p-oxybenzoyl moiety, approximately 10 mole percent 2,6-dicarboxynaphthalene moiety, approximately 10 mole percent isophthaloyl moiety, and approximately 20 mole percent 1,4-dioxyphenylene moiety. More specifically, 84 percent of the tenacity of the fiber of Example I was retained, and only 11 percent of the tenacity of the fiber of U.S. Pat. No. 4,083,829 was retained upon testing for hydrolytic stability. The hydrolytic stability test was conducted by placing each fiber sample in a sealed tube containing 20 ml. of distilled water and 5 ml. morpholine, heating the tube and contents for 3 hours at 176° C., cooling the tube and contents, and testing the resulting fiber samples on an Instron testing machine to determine tenacity in accordance with standard testing procedures. The strength retention of the fiber sample after hydrolysis is calculated using the following formula:

$$\frac{\text{tenacity following hydrolysis}}{\text{tenacity before hydrolysis}} \times 100 = \text{percent strength retention}$$

Although the invention has been described with preferred embodiments it is to be understood that variations and modifications may be employed without departing from the concept of the invention as defined in the following claims.

I claim:

1. A melt processable polyester capable of forming an anisotropic melt phase at a temperature below 290° C. consisting essentially of the recurring moieties I, II, III, and IV wherein:

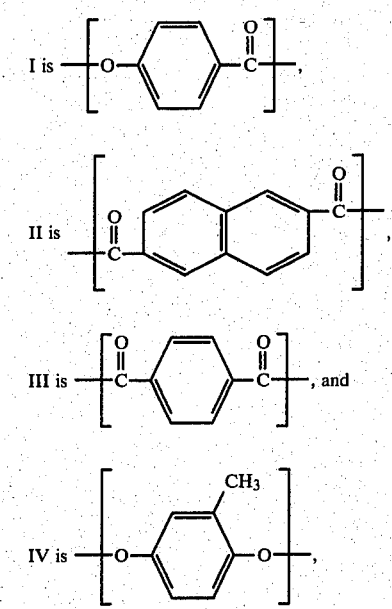

and wherein said polyester comprises approximately 45 to 55 mole percent of moiety I, approximately 15 to 25 mole percent of moiety II, approximately 4 to 10 mole percent of moiety III, and approximately 20 to 30 mole percent of moiety IV.

2. A melt processable polyester in accordance with claim 1 which exhibits an inherent viscosity of at least 2.5 dl./g. when dissolved at a concentration of 0.3 weight/volume percent in pentafluorophenol at 60° C.

3. A melt processable polyester in accordance with claim 1 which exhibits an inherent viscosity of at least 3.0 dl./g. when dissolved at a concentration of 0.3 weight/volume percent in pentafluorophenol at 60° C.

4. A melt processable polyester in accordance with claim 1 which exhibits an inherent viscosity of approximately 3.0 to 7.5 dl./g. when dissolved at a concentration of 0.3 weight/volume percent in pentafluorophenol at 60° C.

5. A fiber which has been melt spun from the polyester of claim 1.

6. A fiber which has been melt spun from the polyester of claim 1 and subsequently thermally processed.

7. A molded article comprising the melt processable polyester of claim 1.

8. A molding compound comprising the melt processable polyester of claim 1 which incorporates approximately 1 to 60 percent by weight, based upon the weight of the melt processable polyester, of a compound selected from the group consisting of solid fillers and reinforcing agents.

9. A melt processable polyester capable of forming an anisotropic melt phase at a temperature below 290° C. consisting essentially of the recurring moieties I, II, III, and IV wherein:

I is 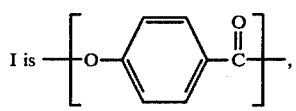

II is 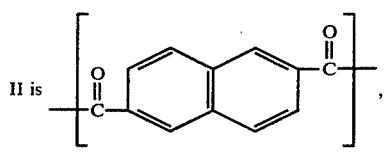

III is 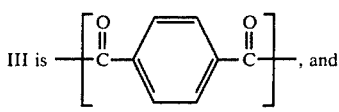, and

IV is 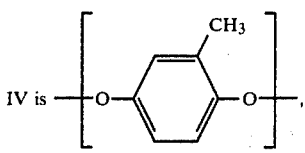, and wherein said polyester comprises approximately 50 mole percent of moiety I, approximately 20 mole percent of moiety II, approximately 5 mole percent of moiety III, and approximately 25 mole percent of moiety IV.

10. A melt processable polyester in accordance with claim 9 which exhibits an inherent viscosity of at least 2.5 dl./g. when dissolved at a concentration of 0.3 weight/volume percent in pentafluorophenol at 60° C.

11. A melt processable polyester in accordance with claim 9 which exhibits an inherent viscosity of at least 3.0 dl./g. when dissolved at a concentration of 0.3 weight/volume percent in pentafluorophenol at 60° C.

12. A melt processable polyester in accordance with claim 9 which exhibits an inherent viscosity of approximately 3.0 to 7.5 dl./g. when dissolved at a concentration of 0.3 weight/volume percent in pentafluorophenol at 60° C.

13. A fiber which has been melt spun from the polyester of claim 9.

14. A fiber which has been melt spun from the polyester of claim 9 and subsequently thermally processed.

15. A molded article comprising the melt processable polyester of claim 9.

16. A molding compound comprising the melt processable polyester of claim 9 which incorporates approximately 1 to 60 percent by weight, based upon the weight of the melt processable polyester, of a compound selected from the group consisting of solid fillers and reinforcing agents.

* * * * *